United States Patent [19]

Chamberlain et al.

[11] Patent Number: 4,568,977

[45] Date of Patent: Feb. 4, 1986

[54] ON-CHIP CCD REALIZATION OF THE LAPLACIAN OPERATOR FOR IMAGE SIGNAL PROCESSING

[75] Inventors: Savvas G. Chamberlain, Waterloo, Canada; Keith S. Pennington, Somers, N.Y.; Gene D. Rohrer, Concord, N.C.

[73] Assignee: International Business Machines Corporation, Armonk, N.Y.

[21] Appl. No.: 509,831

[22] Filed: Jun. 29, 1983

[51] Int. Cl.$^4$ .............................................. H04N 5/14
[52] U.S. Cl. .................................... 358/160; 358/166; 358/167; 382/54
[58] Field of Search ............... 358/160, 213, 167, 162, 358/166; 307/444, 607; 357/24; 364/724, 862; 377/57, 62, 63; 365/183; 333/165; 382/53, 54

[56] References Cited

U.S. PATENT DOCUMENTS

| | | |
|---|---|---|
| 4,010,319 | 3/1977 | Levine ................................ 358/213 |
| 4,011,441 | 3/1977 | Michon et al. ..................... 358/213 |
| 4,129,887 | 12/1978 | Michon ................................ 357/23 |
| 4,178,614 | 12/1979 | Sauer .................................. 358/213 |
| 4,264,930 | 4/1981 | White ................................. 358/213 |
| 4,489,390 | 12/1984 | Parenti et al. ...................... 364/724 |

OTHER PUBLICATIONS

"A Mask Programmable Charge Transfer Analog Multiplier", 1977 IEEE, International Solid-State Circuits Conference, Digest of Technical Papers, pp. 26–27 by Howard S. Goldberg et al.

*Primary Examiner*—Michael A. Masinick
*Assistant Examiner*—Michael D. Parker
*Attorney, Agent, or Firm*—Sughrue, Mion, Zinn, Macpeak, and Seas

[57] ABSTRACT

The Laplacian operator is obtained by using CCD architecture to provide positive and negative weights to respective inputs and then combining the weighted signals.

7 Claims, 7 Drawing Figures

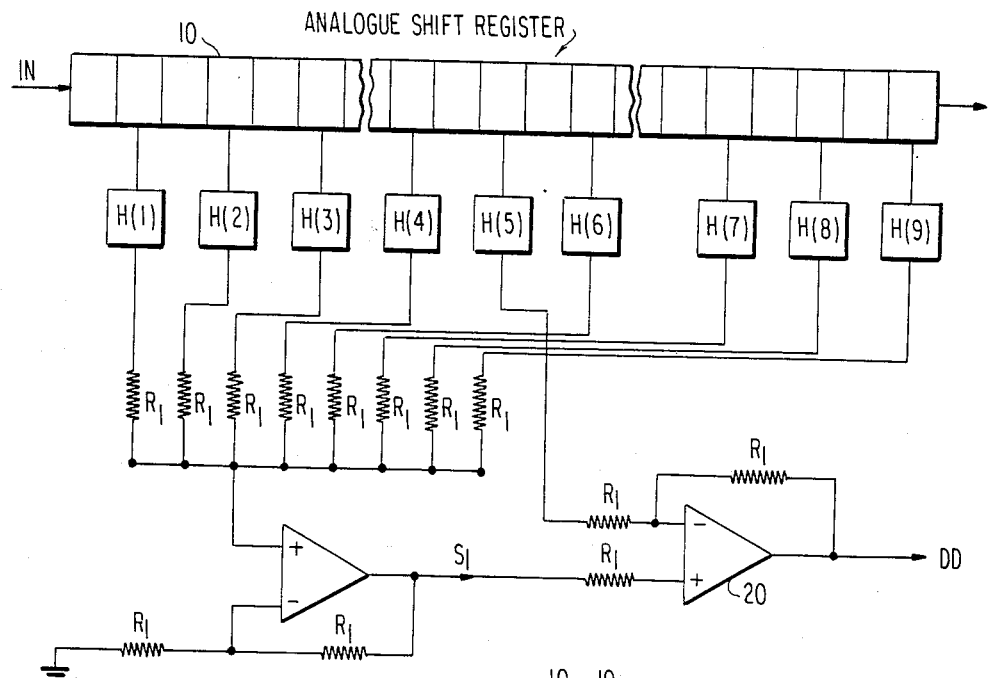
FIG.1
FIG.2
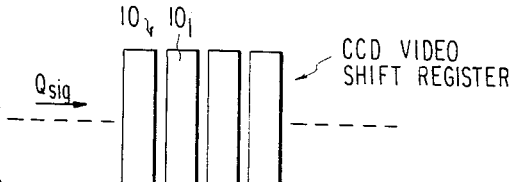
FIG.4

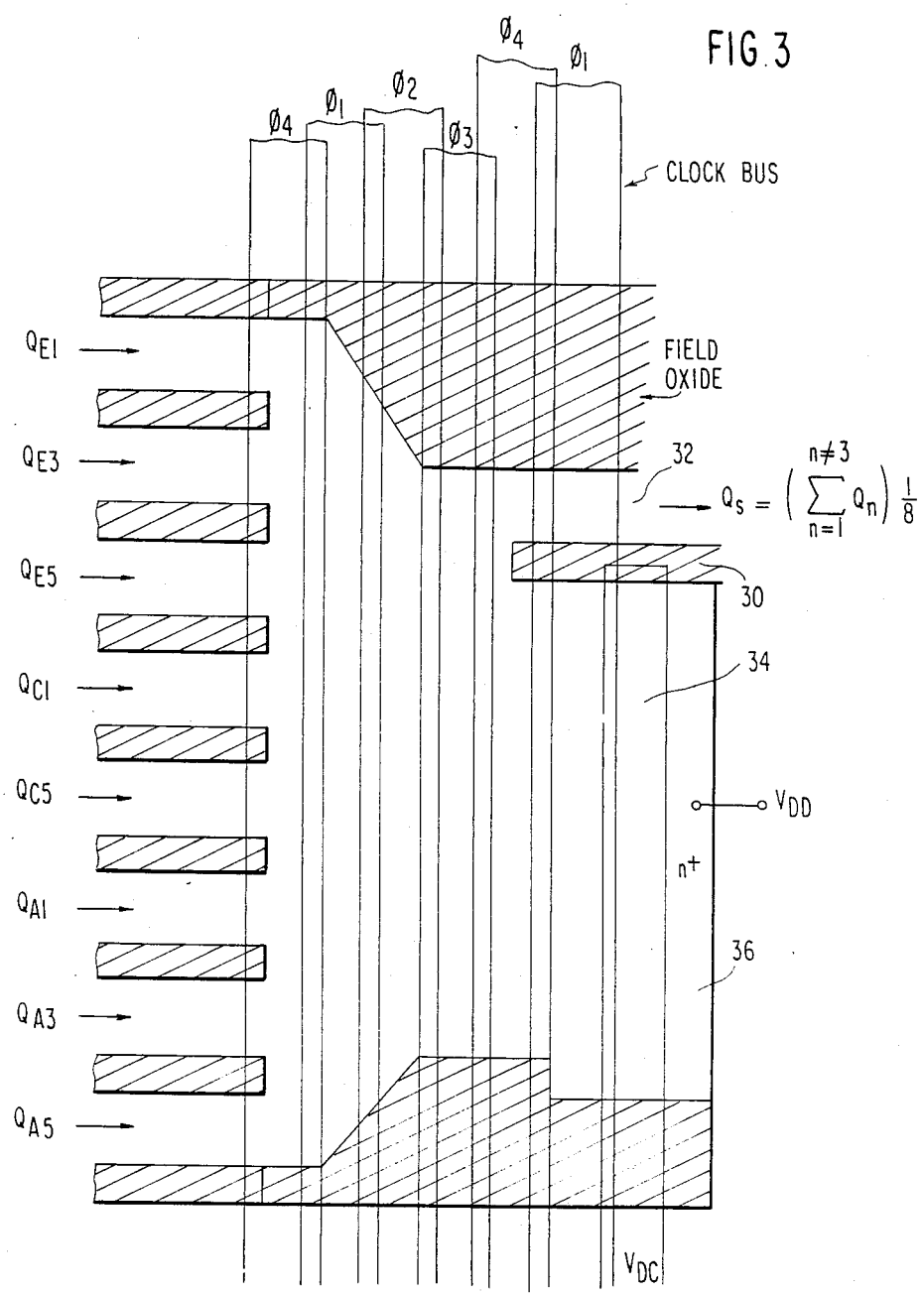

ON-CHIP CCD REALIZATION OF THE LAPLACIAN OPERATOR FOR IMAGE SIGNAL PROCESSING

DESCRIPTION

1. Technical Field

The present invention is generally directed to image signal processing, and is more specifically directed to a device for processing image signal information. Still more specifically, the present invention is directed to a device for implementing the Laplacian operator function on a single silicon chip.

The use of solid-state image sensors to produce an electrical signal representing an image has become very widespread, and there are a number of different signal processing techniques for deriving the information from the sensor array. Examples are disclosed in U.S. Pat. No. 4,178,614 issued to Donald J. Sauer on Dec. 11, 1979, U.S. Pat. No. 4,010,319 issued to Peter A. Levine on Mar. 1, 1977, U.S. Pat. No. 4,129,887 issued to Gerald J. Michon on Dec. 12, 1978, U.S. Pat. No. 4,011,441 issued to Michon et al on Mar. 8, 1977, and U.S. Pat. No. 4,264,930 issued to James M. White on Apr. 28, 1981. A very common type of solid-state image sensor is a charge coupled device (CCD) array, and it is known that the sensitivity of such a CCD array may be enhanced by operating the array in a time delay and integration (TDI) mode.

It is also known to enhance the operation of the CCD array by deriving the Laplacian for the picture elements of the image, and the Laplacian may be approximated by measuring the average light intensity in an area of the array surrounding a particular picture element and subtracting from that average intensity the intensity of the particular image element.

2. Prior Art

Fig. 1 is a schematic diagram for realizing an approximation of the Laplacian operator function. A CCD analog shift register 10 is loaded with a video signal representing an image and, as the video signal is shifted through the register 10, nine pels, or picture elements, are non-destructively sensed. Each sensed pel is individually multiplied by a weight H(n). Eight of the signals are individually multiplied by a positive weight and are summed by a summing circuit which produces a positive signal S1. The remaining one of the nine sensed outputs is multiplied by a negative weight and is then summed with the summation signal S1 in order to produce the desired output function DD. In practice, the summation of the eight positively-weighted signals is performed first, and then a differential amplifier 20 is used to produce the negative weight and the final summation signal. The output DD of the differential amplifier 20 is the Laplacian part of the image represented by the nine sensed pels.

For the analog delay line 10, a CCD shift register is typically used. In some applications, it is necessary that the output rate of the video signal be on the order of 20 MHz, and for such applications buried channel CCD's are usually employed. When cost-performance is considered, it is advantageous to include the buried channel CCD shift register and the rest of the signal processing circuits on the same silicon chip. MOSFET devices and circuits including CCD's can be integrated on the same silicon chip. However, to realize a 20 MHz MOSFET operational amplifier on the same CCD chip would require considerable silicon chip area and MOSFET's with a gain bandwidth product of greater than 400 MHz. An amplifier of this type is very involved and complex and, in addition, introduces excess noise in the output signal.

The above-cited U.S. Pat. No. 4,264,930 to White discloses a technique for approximating the Laplacian operator function which relies more heavily on CCD technology to perform the calculations, but the structure is somewhat complex and is not implemented on a single semiconductor chip.

SUMMARY OF THE INVENTION

It is an object of the present invention to provide a device for realizing the Laplacian operator function on a single CCD chip.

It is a further object of this invention to provide a device for realizing the Laplacian operator function while reducing the level of excess noise introduced into the video signal.

Briefly, these and other objects are achieved by a CCD implementation of the Laplacian operator function which does not require the use of a differential amplifier. According to the present invention, the eight outputs from the analog shift register are provided in parallel to a CCD analog multiplier which combines and weights the signals. Prior to reading the signals out of the shift register, one of the signals is non-destructively sensed and its corresponding value provided to a four-quadrant charge transfer analog multiplier for application of a negative weight. The signals are then combined and the combined charge is sensed to obtain an output signal which is the Laplacian part of the image represented by the original pel signals.

According to the present invention, the video signal is maintained in its analog form where it is represented by charge packets. These charge packets are then manipulated in a novel way in order to introduce both positive and negative weights on the signal, with the weighted signals then being summed in order to produce the Laplacian operator function. With the scheme according to the present invention, no excess noise is introduced into the video signals since the charge manipulation is carried out at the same speed as the clock rate of the CCD shift register. Further, timing and clocking are in synchronization with the clock rate of the shift register. The entire Laplacian operator function of the present invention can be integrated on a single silicon chip using standard MOSFET-CCD silicon technology.

BRIEF DESCRIPTION OF THE DRAWINGS

The present invention will be more clearly understood from the following description in conjunction with the accompanying drawings, wherein:

FIG. 1 is a schematic diagram of a conventional implementation of the Laplacian operator function;

FIG. 2 is a diagram illustrating an image plane including a matrix of picture elements;

FIG. 3 is a plan view of a CCD structure for weighting and combining a plurality of the picture element signals;

FIG. 4 is a schematic diagram illustrating the non-destructive sensing of the ninth picture element signal from the video shift register;

DETAILED DESCRIPTION OF THE PREFERRED EMBODIMENT OF THE INVENTION

Figure 5:
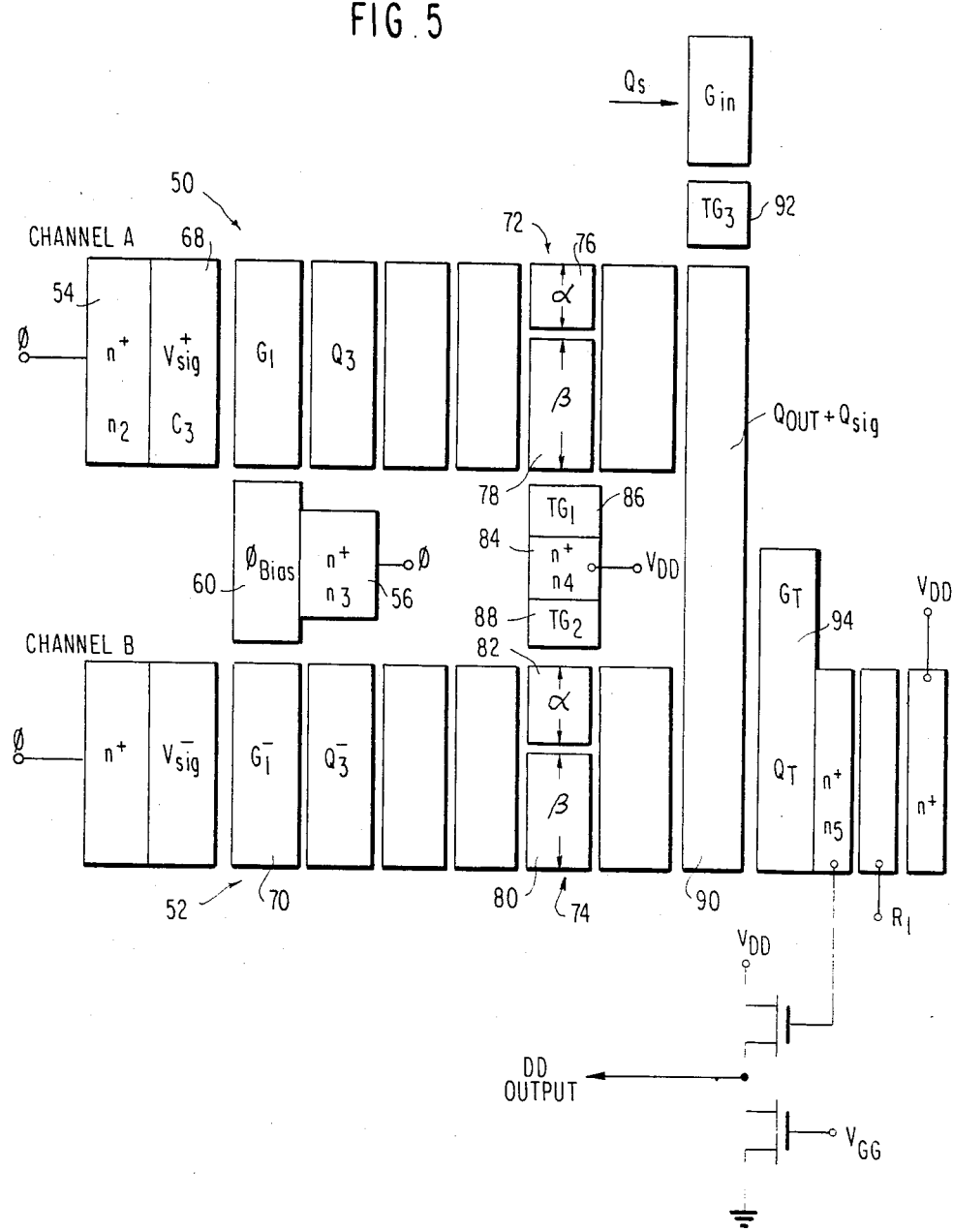
FIG. 5 is a plan view of the remaining CCD circuitry for providing the negative weight to the ninth picture element and for combining the negatively weighted signal with the output from the circuit portion of FIG. 3 in order to obtain the Laplacian operation function.

For a five pel by five pel image plane as shown in FIG. 2, the Laplacian of an image represented on the image plane can be approximated by the function DD defined by:

$$DD = ((A5+A3+A1)\cdot\tfrac{1}{8} + (C5+C1)\cdot\tfrac{1}{8} + (E5+E3+E1)\cdot\tfrac{1}{8}) - C3$$

or $$DD = (A5+A3+A1+C5+C1+E5+E3+E1)/8) - C3$$

FIG. 3 illustrates a CCD implementation for obtaining the sum of the video charges, $$(QA5+QA3+QA1+QC5+QC1+QE5+QE3+QE1)/8 = Q_S$$

The individual video charges in the CCD video signal shift register such as designated by reference numeral 10 in FIG. 1 are shifted in parallel into the CCD device from the left side of FIG. 3. The charges are combined as they are shifted from left to right by the successive shifting signals $\phi_1$–$\phi_4$. A channel stopper 30 separates the CCD charge-carrying region into a first channel 32 and a second channel 34. The channel area of the first channel 32 is $\tfrac{1}{8}$ of the total channel area of the channels 32 and 34, and the voltage $V_{DD}$ applied to the n+ region 36 serves to drain off the electron charge from the channel 34. As a consequence, the charge output provided from the channel 32 corresponds to $\tfrac{1}{8}$ of the sum of the input charges, i.e. it corresponds to the charge $Q_S$ defined in the above equation.

While the eight charges QA5, QA3, QA1, QC5, QC1, QE5, QE3 and QE1 are shifted out of the analog video signal shift register 10 into the CCD device of FIG. 3, the ninth charge signal QC3 is non-destructively sensed from the shift register 10, and FIG. 4 is an illustration of one possible implementation of the sensing circuitry. The charge packets corresponding to individual picture elements are shifted through the CCD video shift register 10 and, at some time before the charge packet QC3 arrives at the CCD stage 10$_1$, the clock signals $\phi_1$ and $\phi_2$ can be used to gate the FET switching transistors 40 and 41, respectively, to charge the line 42 up to the level of $V_{DD}$. When the charge QC3 arrives at the stage 10$_1$, it is coupled to the output line 42 in a well-known manner. The charge QC3 will be a negative electron charge corresponding to the sensed image element and will lower the potential on line 42 by a proportional amount. The lowered potential is provided to the gate of transistor 43 in the source follower circuit 44 which will consequently generate an output signal V+$_{sig}$. The lowered potential on line 42 will also be provided to the gate of transistor 45 in the inverting amplifier circuit 46, and the inverting amplifier circuit 46 will then provide an output signal V−$_{sig}$.

Figure 6A:
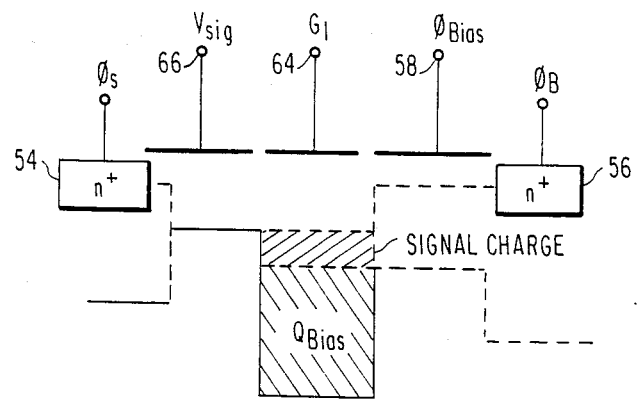
FIGS. 6A and 6B are a waveform diagram and plan view, respectively, for illustrating the operation of each channel of the four quadrant charge transfer analog multiplier of FIG. 5.
Figure 6B:
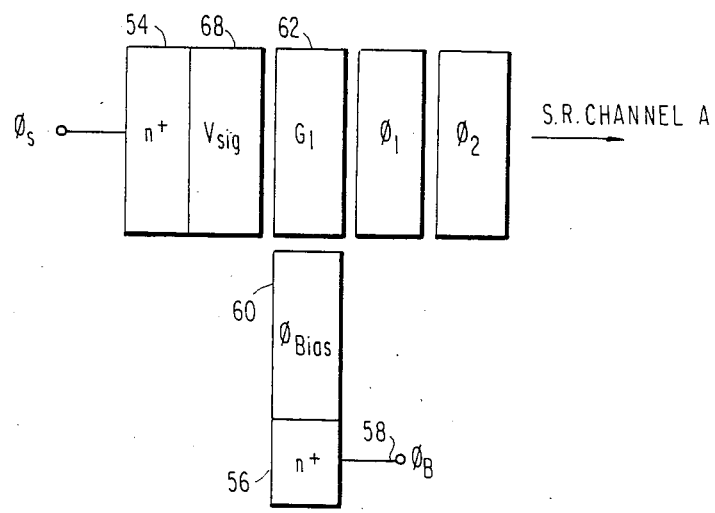

The voltage signals V+$_{sig}$ and V−$_{sig}$ are then provided to respective channels 50 and 52 of a four-quadrant charge transfer analog multiplier as shown in FIG. 5. The operation of the input portion of the channel 50 in FIG. 5 can be understood with reference to the largely self-explanatory drawings of FIGS. 6A and 6B. A source of electron charge is maintained in the n+ region 54, and a similar charge source is maintained in the n+ region 56. A signal $\phi_{BIAS}$ applied to the terminal 58 will either raise or lower the stored charge in the region 60, and the application of the V+$_{sig}$ signal to the electrode 66 will result in the storage in region 68 of a charge proportional to the charge QC3. The two stored charges can then be transferred to and combined in the region 62 by a subsequent pulse applied to the electrode 64, and the resulting charge Q$_A$ in the region 62 will be:

$$Q_A = (Q_{BIAS} + Q_{sig}).$$

The operation of the lower channel 52 in FIG. 5 will be similar, and the resulting charge in the region 70 will be:

$$Q_B = (Q_{BIAS} - Q_{sig}).$$

The analog multiplication portion embodied in the channels 50 and 52 of FIG. 5 is a multiplier of the type described by Howard S. Goldberg et al in "A Mask Programmable Charge Transfer Analog Multiplier", 1977 IEEE, International Solid-State Circuits Conference, Digest of Technical Papers, pages 26–27. The charge packets Q$_A$ and Q$_B$ are shifted along the channels 50 and 52, respectively, until they encounter CCD shift register stages 72 and 74, respectively, each having a channel stopper region. The channel stopper in the stage 72 divides that stage into a first channel area 76 and a second channel area 78. The fraction of the channel area in the stage 72 represented by the channel 76 is $\alpha$, and the fraction of the channel area of the stage 72 represented by the channel 78 is $\beta$. The CCD stage 74 in channel 52 is similarly divided into a first channel 80 and a second channel 82 having channel area fractions $\beta$ and $\alpha$, respectively.

The n+ region 84 in FIG. 5 operates similarly to the n+ region 36 in FIG. 3 to drain off the electron charge from the channel region 78 when the transfer gate 86 is open, and to drain off the electron charge from the channel area 82 when the transfer gate 88 is open. The transfer gates 86 and 88 are opened by gating signals (not shown) at appropriate times. It will be appreciated that the gates 86 and 88 should be opened at least once during each clock cycle of the CCD channels 50 and 52 to ensure that the channel regions 78 and 82 are drained once during each shift cycle. It is also preferable that the gates 86 and 88 not be opened simultaneously. The charge passed on through the channel 76 to the subsequent CCD stage will be $Q_A(\alpha/(\alpha+\beta))$, and the charged passed on through the channel 80 to the subsequent CCD stage will be $Q_B(\beta/(\alpha+\beta))$. The two signals can then be combined in the CCD stage 90 to obtain a charge signal $Q_{OUT} = QBIAS(\alpha+\beta) + Q_{sig}(\alpha-\beta)$. Since $\alpha+\beta=1$, and if the values of $\alpha$ and $\beta$ are chosen such that $(\alpha-\beta)=W$, equation can be rewritten as $$Q_{OUT} = Q_{BIAS} + WQ_{sig}.$$

If the values $\alpha$ and $\beta$ are chosen such that $\beta > \alpha$, then W will be negative.

The output $Q_{OUT}$ is thus the input analog signal multiplied by a coefficient W with an added constant bias. The output signal $Q_S$ from the summation and weighting circuitry of FIG. 3 is provided through the gate $G_{in}$ and the transfer gate 92 to be combined with the signal $Q_{OUT}$ in the stage 90, and the charge transferred to the subsequent CCD stage 94 will be given by $$Q_T = Q_S - Q_{C3} + Q_{BIAS}.$$

The charge QT is then sensed in a known manner by an output structure which eliminates the bias charge and produces a voltage which corresponds to the desired function DD.

As can be seen from the above, the structure according to the present invention allows the Laplacian operator to function to be implemented without the use of a differential amplifier. Instead, charge transfer analog multiplier structures are used which, together with a few simple MOSFET switching devices, can be implemented in a single silicon chip. The arrangement according to the present invention can replace a number of discrete hardware signal processing units and can result in significant cost and performance savings in data acquisition and image processing equipment.

Having thus described our invention, what we claim as new, and desire to secure by Letters Patent is:

1. An apparatus for receiving a plurality of inputs and subjecting said inputs to a Laplacian operator function, said apparatus comprising CCD shift register means for receiving said inputs and introducing positive and negative weights to respective ones of said inputs, and combining said inputs to produce said Laplacian operator function, said CCD shift register means comprising: a first CCD shift register for producing a weighted sum of a first plurality of said inputs; a second CCD shift register for introducing a negative weight to at least one of said inputs; CCD summation means for combining said weighted sum and said negatively-weighted at least one input; and sensing means for sensing the charge in said CCD summation means to obtain a signal corresponding to said Laplacian operator function.

2. An apparatus as defined in claim 1, wherein said first CCD shift register comprises a plurality of serially coupled first CCD shift register stages for receiving and combining said selected inputs, and channel means for defining a channel in at least one of said first shift register stages, the size of said channel bearing a predetermined ratio to the size of the total charge storage area in said shift register stage.

3. An apparatus as defined in claim 2, further comprising draining means for draining the charge from the remaining portion of said at least one shift register stage, whereby said channel passes a charge corresponding to a fraction of the sum of said selected inputs.

4. An apparatus as defined in claim 1, wherein said second CCD shift register comprises:
means for generating a first signal corresponding to the value of said at least one input;
means for generating a second signal corresponding to the inverse of said at least one input;
a positive CCD shift register channel for receiving said first signal as an input and shifting a charge corresponding to said first signal toward an output, said positive CCD shift register channel comprising a plurality of serially connected CCD stages at least one of which is divided into first and second charge storage areas with said first area passing a fraction $\alpha/(\alpha+\beta)$ of the total charge in said stage, where $\alpha$ and $\beta$ are positive real numbers;
a negative CCD shift register channel receiving said second signal as an input and shifting a charge corresponding to said second signal toward an output, said negative CCD shift register channel comprising a plurality of serially connected CCD stages at least one of which is divided into first and second charge storage areas with said first area passing a fraction $\beta/(\alpha+\beta)$ of the total charge in said stage; and
means for combining the outputs of said positive and negative CCD shift register channels.

5. An apparatus as defined in claim 4, further comprising second draining means for draining the charge from said second areas.

6. An apparatus as defined in claim 4, wherein said means for combining the outputs of said positive and negative CCD shift register channels combines said outputs with said weighted sum from said first CCD shift register.

7. An apparatus as defined in claim 4, wherein $\beta > \alpha$.

* * * * *